3,144,036
METHOD AND SYSTEM FOR CONTROLLING PRESSURE IN STORAGE VESSELS
Frederic L. Rice, Jr., Bartlesville, Okla., assignor to Phillips Petroleum Company, a corporation of Delaware
Filed Apr. 25, 1962, Ser. No. 190,067
4 Claims. (Cl. 137—12)

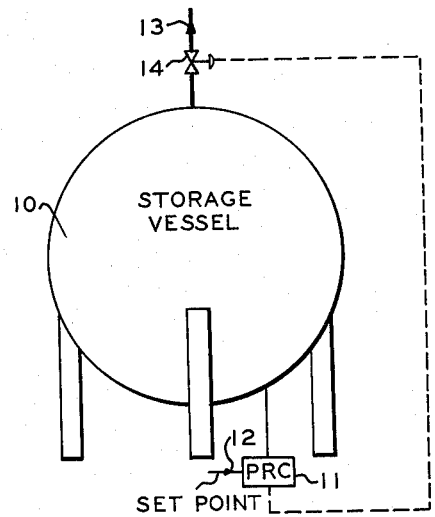

This invention relates to a method of and apparatus for controlling the pressure in storage vessels. In a specific aspect, this invention relates to a storage vessel pressure relief system.

The maximum operating pressure of a storage vessel is determined by the maximum pressure that can be sustained by the tank bottom, or in the case of walled tanks, the maximum pressure that can be sustained by the bottom ring or wall immediately adjacent to the bottom of the tank. The pressure exerted against the bottom of the tank or the bottom of the tank wall, said tank containing a liquid, is equal to the liquid pressure plus the vapor pressure. The terms "storage vessel" and "storage zone" as herein employed refer to an enclosed vessel or zone capable of confining a liquid and vapor mixture.

Conventionally, storage-vessel pressure relief systems are limited by and based upon determining the maximum liquid plus vapor pressure capable of being supported by the bottom ring of the tank and operating a vapor space relief valve responsive to the maximum allowable vapor pressure and responsive to the measured vapor pressure with the vessel substantially liquid full. For example, assume that the maximum allowable operating pressure that can be exerted against the bottom ring of the tank is 40 p.s.i.g. Further assume that the liquid head pressure of the tank substantially full is 30 p.s.i.g. Therefore, a vapor pressure in excess of 10 p.s.i.g. would actuate the conventional pressure relief valve.

A disadvantage of the conventional relief system when applied to storage vessels wherein the top of the storage vessel can operationally withstand a pressure greater than 10 p.s.i.g., is that when the liquid pressure in the storage vessel is less than 30 p.s.i.g., the vapor pressure can safely exceed 10 p.s.i.g. Therefore, operational efficiency of the storage vessel is unnecessarily impaired by the conventional pressure relief system.

I have discovered an improved storage-vessel pressure relief system wherein a pressure measurement representative of the liquid plus vapor pressure within a storage vessel is made and a vapor space relief valve manipulated responsive to said measurement and responsive to a set point representative of the maximum allowable liquid pressure and vapor pressure within said storage vessel.

Accordingly, an object of my invention is to provide an improved storage-vessel pressure control system.

Another object of my invention is to provide an improved storage-vessel pressure relief control system.

Other objects, advantages, and features of my invention will be readily apparent to those skilled in the art from the following description and the appended claims.

The drawing is a schematic representation of one embodiment of the inventive pressure control system.

The inventive control system as hereinafter described is applicable to a storage vessel containing a liquid having a vapor pressure at the storage temperature.

Referring to FIGURE 1, there is illustrated a spherical-shaped storage vessel 10 conventionally constructed such that the top of storage vessel 10 is capable of withstanding a pressure substantially equal to the maximum permissible pressure that can be exerted upon the bottom of storage vessel 10. A pressure measurement representative of the total liquid and vapor pressure within storage vessel 10 is transmitted to a conventional pressure-recorder-controller 11. Conventional pressure controller function is described in "Instruments and Process Control," by New York State Vocational and Practical Arts Association, page 54. A suitable pressure-recorder-controller is manufactured by Foxboro Company, Foxboro, Massachusetts, and illustrated in Bulletin 5A–10A. Reference is also made to U.S. Patent 2,742,917 describing the action of a suitable conventional pressure controller. This pressure measurement is compared with a set point 12 representative of the maximum allowable pressure within storage vessel 10 and a signal responsive thereto transmitted to a means for opening or closing a conventional relief valve 14, such as a solenoid actuated relief valve.

Valve 14 is thus opened or closed so as to control the flow of vapor through conduit means 13, thereby maintaining the pressure within storage vessel 10 at or below the maximum allowable pressure.

*Example*

A maximum allowable bottom ring pressure due to the liquid and vapor pressure within storage tank 20 is equal to 50 p.s.i.g. The liquid pressure of storage tank 20 substantially liquid full is equal to 40 p.s.i.g. The maximum permissible vapor pressure within storage tank 20, said storage tank 20 containing a liquid pressure of 40 p.s.i.g., is 10 p.s.i.g. The joint between the tank walls and the top of the tank, conventionally a pressure-limiting factor, is capable of withstanding a pressure equal to 15 p.s.i.g.

By operation of the inventive control system, the liquid pressure within storage tank 20 can be reduced to 35 p.s.i.g. and the vapor pressure increased to 15 p.s.i.g. and pressure relief valve 22 will remain closed.

As will be evident to those skilled in the art, various modifications of this invention can be made, or followed, in the light of the foregoing disclosure and discussion without departing from the spirit or scope thereof.

I claim:
1. A method of control which comprises measuring a pressure within a storage zone representative of the total liquid head and vapor pressure within said storage zone, and relieving the vapor pressure within said storage zone responsive to a predetermined total liquid head and vapor pressure.

2. A pressure relief system comprising a storage vessel, means for measuring a pressure within said storage vessel representative of the total liquid head and vapor pressure within said storage vessel, and means for relieving the vapor pressure within said storage vessel responsive to a predetermined total liquid head and vapor pressure.

3. A method of control which comprises measuring a pressure within a storage zone representative of the total liquid head and vapor pressure within said storage zone, passing a signal representative of said measurement to a means for relieving the vapor pressure within said storage zone, and manipulating the rate of flow of vapor from said storage zone responsive only to said measurement and a set point representative of the total allowable maximum liquid head and vapor pressure within said storage zone.

4. A pressure relief system comprising a storage vessel, means for measuring a pressure within said storage vessel representative of the total liquid head and vapor pressure within said storage vessel, and means for relieving the vapor pressure within said storage vessel responsive only to said pressure measurement and a set point representative of the total allowable maximum liquid head and vapor pressure within said storage vessel.

References Cited in the file of this patent
UNITED STATES PATENTS
2,586,410   Williams _____ Feb. 19, 1952